(12) United States Patent
Hossack

(10) Patent No.: US 6,461,299 B1
(45) Date of Patent: Oct. 8, 2002

(54) MEDICAL DIAGNOSTIC ULTRASOUND SYSTEM AND METHOD FOR HARMONIC IMAGING WITH AN ELECTROSTATIC TRANSDUCER

(75) Inventor: John A. Hossack, Charlottesville, VA (US)

(73) Assignee: Acuson Corporation, Mountain View, CA (US)

(*) Notice: Subject to any disclaimer, the term of this patent is extended or adjusted under 35 U.S.C. 154(b) by 0 days.

(21) Appl. No.: 09/469,994

(22) Filed: Dec. 22, 1999

(51) Int. Cl.⁷ ................................. A61B 8/00
(52) U.S. Cl. ....................... 600/437; 600/443
(58) Field of Search ...................... 600/437, 443, 600/447, 459; 310/309, 317, 334

(56) References Cited

U.S. PATENT DOCUMENTS

| | | | |
|---|---|---|---|
| 3,736,552 A | * | 5/1973 | Sessler et al. ............... 367/7 |
| 4,034,332 A | * | 7/1977 | Alais ......................... 367/153 |
| 4,887,246 A | * | 12/1989 | Hossack et al. ............ 367/140 |
| 5,632,277 A | | 5/1997 | Chapman et al. |
| 5,675,554 A | | 10/1997 | Cole et al. |
| 5,706,819 A | | 1/1998 | Hwang et al. |
| 5,740,128 A | | 4/1998 | Hossack et al. |
| 5,902,243 A | | 5/1999 | Holley et al. |
| 5,913,823 A | | 6/1999 | Hedberg et al. |
| 6,213,947 B1 | * | 4/2001 | Phillips ....................... 600/443 |
| 6,292,435 B1 | | 9/2001 | Savord et al. |

OTHER PUBLICATIONS

Peng Jian et al., A New Tissue Harmonic Imaging Scheme with Better Fundamental Frequency Cancellation and Higher Signal–To–Noise Ratio; Jul. 1998; pp. 1589–1594;.

Igal Ladabaum et al., Surface Micromachined Capacitive Ultrasonic Transducers; May 3, 1998; pp. 678–690;.

R.A. Noble; Novel Silicon Nitride Micromachined Wide Bandwidth Ultrasonic Transducer, pp. 1–4;.

* cited by examiner

Primary Examiner—Francis J. Jaworski

(57) ABSTRACT

A method and system for generating transmit pulses for use with an electrostatic transducer in harmonic imaging are provided. The excitation waveforms are pre-distorted to account for the non-linear output of the electrostatic transducer. Additionally, the force on a multiple element electrostatic transducer array is measured. A bias voltage is applied to the electrostatic transducer where the bias voltage is responsive to the measured force.

55 Claims, 7 Drawing Sheets

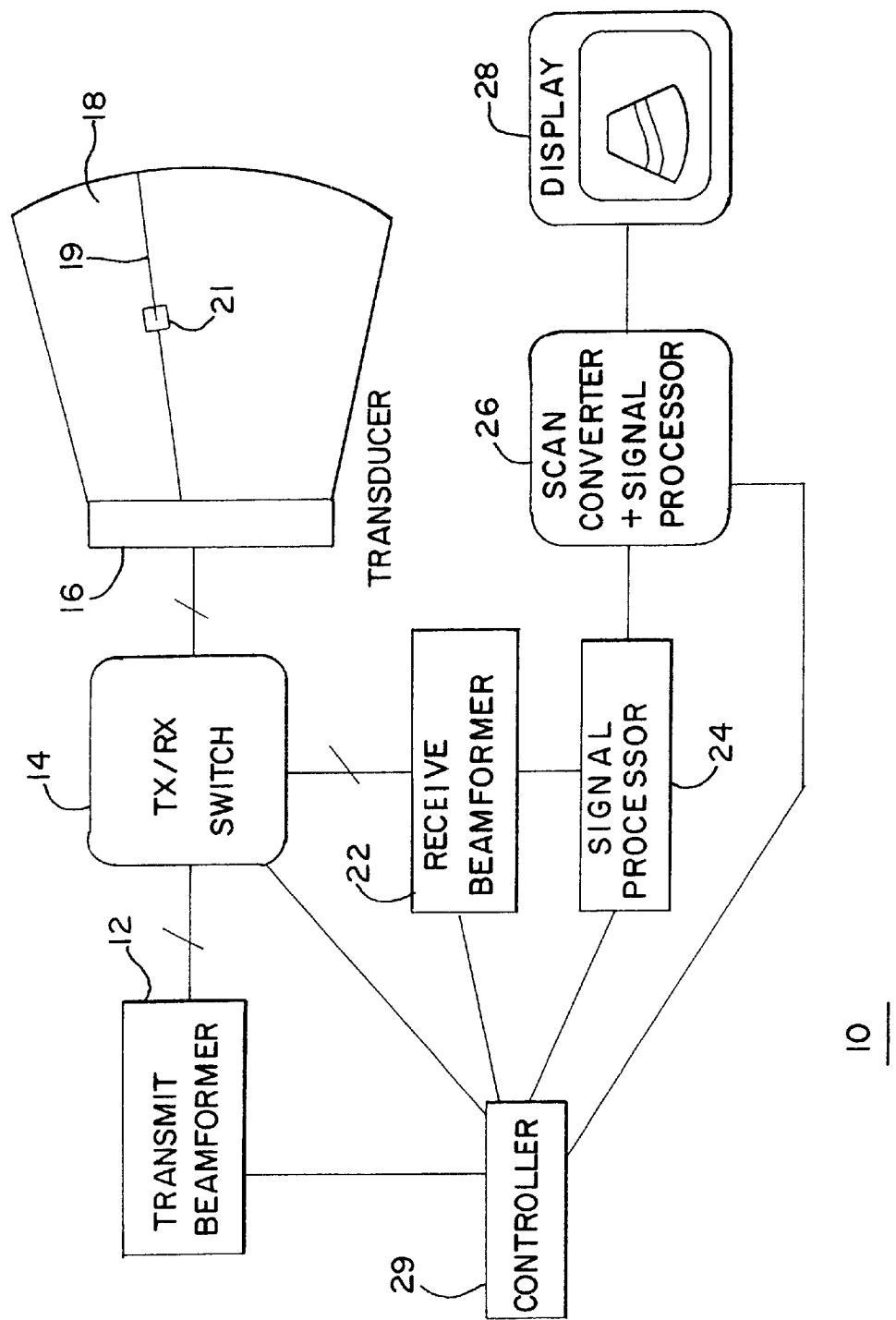

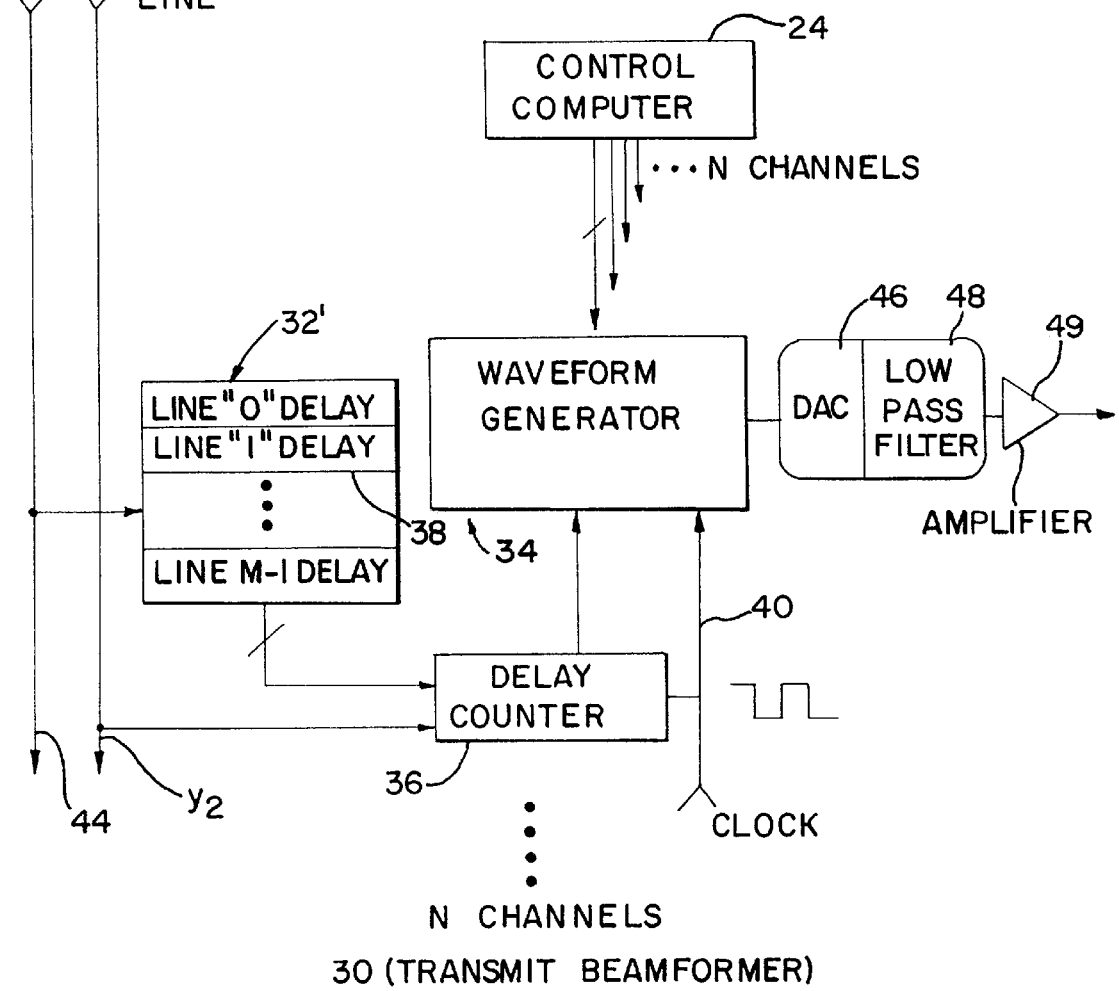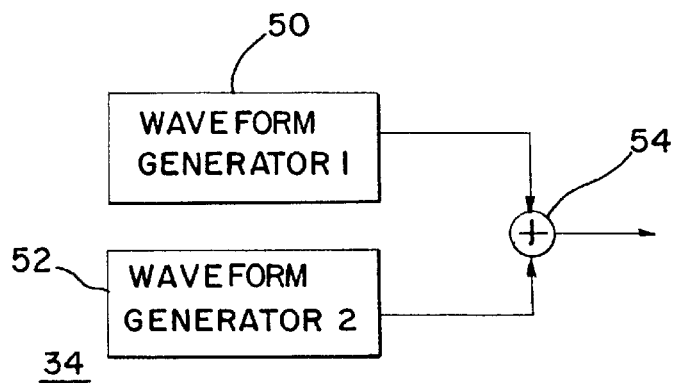

ORIGINAL APPLIED VOLTAGE-
CASE 2.5 MHz   40% BW   50% VAC(PEAK)/Vdc

ORIGINAL APPLIED VOLTAGE (FREQUENCY DOMAIN)

MEDICAL DIAGNOSTIC ULTRASOUND SYSTEM AND METHOD FOR HARMONIC IMAGING WITH AN ELECTROSTATIC TRANSDUCER

BACKGROUND

This invention relates to a medical diagnostic ultrasound system and method for harmonic imaging. In particular, the invention relates to generation of waveforms for use with electrostatic transducers.

Electrostatic transducers, such as micro-machined capacitance based electrostatic transducers, offer many advantages over traditional ceramic transducers. For example, electrostatic transducers may be cheaper to manufacture, allow higher manufacturing yields, provide more size and shape options, use non-toxic materials and have higher bandwidth. However, electrostatic transducers generate harmonic signals when excited with a waveform at a fundamental frequency. The output force is proportional to the square of the applied voltage signal. Additional non-linearities may also exist, such as non-linearities within the membrane and non-linear motion (e.g., bottoming out of the membrane).

For imaging based on the non-linear response at a region of interest in a patient, harmonic information is isolated or combined with fundamental information. Preferably, little or no harmonic information is generated by the system, providing harmonic information based more on the response of the tissue or any contrast agents. To counter undesired generation of harmonic information through propagation, the excitation waveform has a shaped envelope, such as the Gaussian pulses disclosed in U.S. Pat. No. 5,740,128. Additionally, the excitation waveform may be pre-distorted. See U.S. application Ser. No. 09/061,014, filed Apr. 15, 1998. The '014 application also suggests that "in order to correct for non-linearity introduced in the transmit channel, the electrical waveforms are pre-distorted" (pg. 13, lines 12–13). The application also notes that the transducer is included within the transmission channel (pg. 12, lines 26–29). However, non-linear signal generation problems associated with specific types of transducers are not discussed.

BRIEF SUMMARY

The present invention is defined by the following claims, and nothing in this section should be taken as a limitation on those claims. By way of introduction, the preferred embodiment described below includes a method and system for generating transmit pulses for use with an electrostatic transducer. The excitation waveforms are pre-distorted to account for the non-linear output of the electrostatic transducer.

In one aspect, two excitation waveforms are applied to a multiple element electrostatic transducer array. One of the excitation waveforms compensates for the non-linear output due to the application of the other excitation waveform.

In another aspect, the excitation waveforms discussed above are applied to a transducer array characterized by a force/electrical transduction process with a non-linear response.

In yet another aspect, a force on a multiple element electrostatic transducer array is measured. An excitation waveform is applied to the transducer array. A bias voltage is also applied where the bias voltage is responsive to the measured force.

Further aspects and advantages of the invention are discussed below in conjunction with the preferred embodiments.

BRIEF DESCRIPTION OF SEVERAL VIEWS OF THE DRAWINGS

FIG. 1 is a block diagram of one preferred embodiment of an ultrasonic imaging system.

FIG. 2 is a block diagram of one preferred embodiment of a transmit beamformer suitable for use in the system of FIG. 1.

FIG. 3 is a block diagram of one preferred embodiment of waveform generators.

DETAILED DESCRIPTION OF THE PREFERRED EMBODIMENTS

Figure 4A:
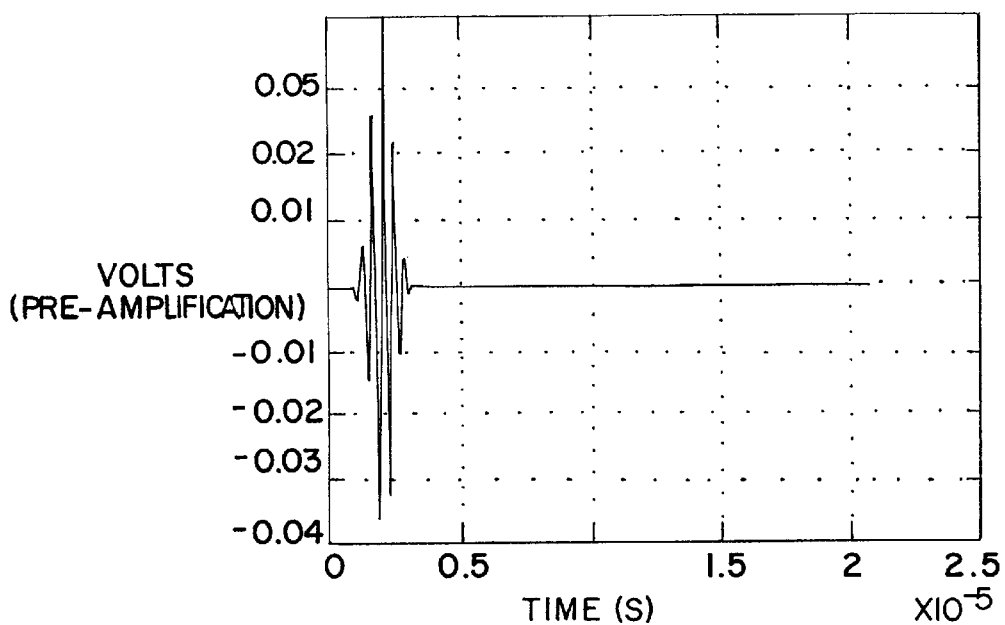
FIGS. 4A and 4C are graphical representations of one embodiment of first and second excitation waveforms, respectively.

Electrostatic transducers inherently produce non-linear outputs. To use an electrostatic transducer and the advantages provided by such transducers for harmonic imaging, the non-linear output is compensated by pre-distorting the applied excitation signal. For example, pre-distorted waveforms are applied to the electrostatic transducers (e.g. micro-machined transducers), such as transducers disclosed in U.S. application Ser. No. 09/223,257, filed Dec. 30, 1998, the disclosure of which is incorporated herein by reference. Such electrostatic transducers are inexpensive disposable high-quality arrays that may be made in large numbers in wafer-form using automated equipment.

The pre-distorted waveforms used include waveforms disclosed in U.S. application Ser. No. 09/061,014, filed Apr. 15, 1998 and/or U.S. Pat. No. 5,740,128, the disclosures of which are both incorporated herein by reference. Other pre-distortion waveforms, pre-distortion techniques and electrostatic transducers may be used.

FIG. 1 shows an ultrasound system 10 used to pre-distort waveforms for generation of acoustic pulses with an electrostatic transducer. The system 10 includes a controller 29 for coordinating the generation of an image, a transmit beamformer 12, a transmit and receive switch or a multiplexer 14, an electrostatic transducer array 16, a receive beamformer 22, a signal processor 24, a scan converter and signal processor 26 and a display 28.

The transmit beamformer 12 supplies excitation transmit waveforms via the multiplexer 14 to the electrostatic transducer array 16. The excitation waveforms are apodized and focused along ultrasonic beams or lines in one of various formats, such as steered linear, sector, or Vector®. The transmit beamformer 12 preferably includes a voltage source for supplying a DC bias voltage to the electrostatic transducer 16. In alternative embodiments, the source is separate from the transmit beamformer 12. The DC bias voltage increases the linearity of the response of the electrostatic transducer 16 where the amplitude of the alternating component of the excitation waveform is a fraction of the applied DC bias voltage. The DC bias voltage also draws the membrane or diaphragm surface closer to the substrate of the electrostatic transducer elements, providing greater efficiency (e.g. a higher electric field for a given applied voltage).

The electrostatic transducer array 16 comprises a multiple element electrostatic transducer array. The elements are arranged in one of various configurations, such as linear, curved linear, 1.5 dimensional, two dimensional or combinations thereof. As used herein, electrostatic transducers include any kind of medical ultrasound vibrating acoustic wave transmitters/receivers which comprise spaced layers whose motion is primarily responsive to electrostatic (Coulomb) forces. Electrostatic transducers include micro-machined, or capacitive systems used as a transducer. For example, electrostatic transducers include a "micro-machined ultrasound transducer". In the preferred embodiment a capacitive electrostatic transducer is utilized. Capacitive electrostatic transducers comprise electrically driveable vibrating micro-diaphragms or membranes made using micro-machining techniques. On each side of a dielectric gap chamber is a capacitor electrode, and the lateral (largest) dimensions of the diaphragm(s)/membrane(s) may be in the micron range. Examples of such devices and processes necessary for their fabrication are known in the art. Additionally the following reference papers discuss capacitive electrostatic transducers:

"Micromachined Capacitive Transducer Arrays for Medical Ultrasound Imaging" X. C. Jin, F. L. Degertekin, S. Calmes X. J. Zhang, I Ladabaum, B. T. Khuri-Yakub (Stanford)(1998 IEEE Ultrasonic Symposium in Sendai);

"Novel Silicon Nitride Micromachined Wide Bandwidth Ultrasonic Transducers" R. A. Noble, R. J. Robertson, D. R. Billlson, D. A. Hutchins (University of Warwick) (1998 IEEE Ultrasonic Symposium in Sendai); and "Surface Micromachined Capacitive Ultrasonic Transducers" Igal Ladabaum, Xuecheng Jin, Hyongsok T. Soh, Abdullah Atalar, Butrus T. Khuri-Yakub (IEEE Trans. Ultra. Ferro. Freq. Ctl Vol 45, No. 3, May 1998). Other electrostatic transducers made using similar or different processes may be used.

The elements of the electrostatic transducer 16 may be arranged in multiple apertures (strips for example) such that said apertures can separately be switched on and off for purposes of narrowing the acoustic beam in the nearfield. The elements, or groups thereof, may likewise be arranged to have differing acoustic performance or different electroacoustic or material properties. In this manner, the overall acoustic beam's spectral behavior is manipulated by switching among such differing elements for purposes such as increasing bandwidth, creating notches in the spectrum, or achieving a real apodization. Other micro-machined devices, such as relays or inductors, may also be integrated into the electrostatic transducer array.

The electrostatic transducer array 16 is preferably of sufficient bandwidth to pass both fundamental and harmonic components of an acoustical waveform and may include a mechanical focus, such as by use of an acoustic lens. The electrostatic transducer array 16 generates an ultrasonic transmit beam 19 in response to the transmit excitation waveforms, and this transmit beam 19 propagates outwardly through a subject 18 being imaged. The ultrasonic transmit beam 19 comprises a plurality of acoustic pressure waveforms, each of the plurality of waveforms is transmitted from an element of the electrostatic transducer array 16 in response to one of the transmit excitation waveforms. The ultrasonic transmit beam 19 corresponds to one or more electrical focal points. Based on delays, the plurality of waveforms are focused at a region along the ultrasound transmit line 19. The region comprises a point, area, volume, multiple points or a line.

The subject 18 being imaged, such as tissue or fluid of a patient, may include an added contrast agent 20. Any suitable contrast agent may be used. Preferably, the contrast agents absorbs ultrasonic energy at a first frequency and radiate ultrasonic energy at a second frequency, different from the first frequency. In this example, the first frequency is referred to as the fundamental frequency, and the second frequency is a harmonic of the first frequency. As used herein, "harmonic" includes sub-harmonics and fractional harmonic energy (e.g. one-half or three-halves of the fundamental), as well as higher harmonics (e.g. two or three times the fundamental). Generally, harmonic frequencies are frequencies corresponding to non-linear propagation or scattering.

Instead of contrast agent harmonic imaging as discussed above, the techniques of the present invention may also be used for tissue harmonic imaging. In tissue harmonic imaging, no contrast agent is added to the subject 18, and the native non-linear characteristics of the tissue are relied on to create the ultrasonic image during an entire imaging session. A typical medical diagnostic ultrasound imaging session comprises imaging a patient for 15 to 30 minutes.

Ultrasonic energy propagated, scattered or radiated at harmonic frequencies, such as a band of frequencies corresponding to the second order harmonic of the transmitted fundamental frequency band, is received by the electrostatic transducer array 16. Ultrasonic energy corresponding to linear propagation and scattering is also received by the electrostatic transducer array 16. In response to the ultrasonic energy, the elements of the electrostatic transducer array 16 generate voltage signals. The voltage signals are provided to a receive beamformer 22.

The receive beamformer 22 is of a construction known in the art, such as an analog or digital receive beamformer capable of processing signals associated with harmonic frequencies. The receive beamformer 22 and the transmit beamformer 12 may comprise a single device. As known in the art, each voltage signal is delayed, apodized, and summed with other voltage signals. Each summed signal represents a region 21 in the subject 18. An ongoing stream of signals represents reflections from the ultrasound beam or line 19 received from the subject 18.

The receive beamformer 22 also demodulates the summed signals to baseband. Alternatively, demodulation is performed prior to summation. The demodulation frequency is selected in response to a harmonic frequency, such as a second harmonic frequency. The summed signals are demodulated to baseband by the selected harmonic frequency (the demodulation frequency). Signals associated with frequencies other than near baseband are removed by low pass filtering. As an alternative or in addition to demodulation, the receive beamformer 16 provides bandpass filtering. Thus, signals at frequencies other than a range of frequencies centered at or near the desired center frequency are filtered from the summed signals. The demodulated or filtered signal is passed to a signal processor 24 as a complex in phase and quadrature (I and Q) signal, but other types of signals such as real value signals may be passed.

The signal processor 24 comprises one or more processors for generating image information, such as spectral Doppler, color Doppler (e.g. velocity, energy, variance and combinations thereof), B-mode or M-mode information. Preferably, the signal processor 24 comprises at least a B/M-mode processor. The signal processor 24 is preferably a digital signal processor. Thus, information representing the intensity or other characteristics of the ultrasonic energy associated with the I and Q signals is generated.

The signal processor 24 outputs information to a scan converter and image processor 26. The scan converter and image processor 26 is of a construction known in the art and generates image information, such as B-mode image information. After scan conversion, information associated with an image is converted to a display value or values. The information is converted to the display value with a lookup table, as known in the art. Other display value generation devices may be used. Display values, or image information, is provided to a display 28 as known in the art. Thus, a two- or three-dimensional image, such as a B-mode image, is displayed.

Data from a plurality of ultrasound lines 19 is used to form each displayed image. A plurality of I and Q signals or samples representing different ranges or depths along the ultrasound line, such as the region 21, form each ultrasound line 19. For harmonic imaging, the energy transmitted from the transducer at harmonic frequencies is preferably minimized, such as by using pre-distortion to compensate for non-linear output of the electrostatic transducer 16.

Turning now to FIG. 2, a block diagram of a first preferred embodiment of the transmit beamformer of FIG. 1 for generating the pre-distorted excitation waveforms is shown. The transmit beamformer 30 preferably includes N channels, one for each of the transducer elements of the electrostatic transducer array 16 (FIG. 1). Alternatively, one channel may be connected to more than one transducer element, or some transducer elements are not connected to a channel. Each channel includes a delay memory 32, a waveform generator 34 and a delay counter 36. The delay memory 32 includes M words 38, such as 256 words, one for each possible steering angle or ultrasound transmit line. For ultrasound transmit lines associated with a plurality of focus regions, each delay word 38 corresponds to a focal region and an ultrasound transmit line. Each delay word 38 of the delay memory 32 is set equal to a negative number equal to the number of clock cycles of the clock signal line 40 that elapse between a start of line signal on line 52 and the first non zero value of the associated waveform. For simplicity, it is assumed that zero is defined as a delay word 38 having the most significant bit equal to 1 and all other bits equal to 0. Hence, the most significant bit becomes an enable signal for the waveform generator 34.

The delay memory 32 is not required. The focusing delay may be calculated in real time. Alternate embodiments of the transmit beamformer are possible, such as varying the waveform on a channel to channel basis with the waveform for each channel incorporating the delay.

The waveform generator 34 is of any construction known in the art such as the generator disclosed in Method and Apparatus For A Transmit Beamformer System, U.S. Pat. No. 5,675,554, the disclosure of which is incorporated herein by reference. Preferably, the waveform generator 34 includes a waveform memory. Alternative means for waveform generation, including RAM or ROM memory, logic based or analog devices, are also possible. The waveform generator 34 in this embodiment stores a single envelope corresponding to the waveform in digital form, which is used for all transmit scan lines. For example, 64 or 128 successive 8-bit words representing the envelope are stored. The magnitude of each 8-bit word corresponds to the voltage amplitude at respective positions in the desired output waveform. When the waveform memory of the waveform generator 34 is read with a 40 megahertz clock on the line 40, the resulting sequence of digital values defines an envelope approximately 0.1 to 10 microseconds in duration. The envelope corresponds to a sampling rate of 8 or more samples for every cycle of a carrier signal. Preferably, the sampling rate is 16 or more samples per carrier cycle. The waveform has an associated center frequency. As used herein, the center frequency represents the frequency in a band of frequencies approximately corresponding to the center of the amplitude distribution. Alternatively, the envelope is stored as amplitude and phase (or equivalently as a complex number) representing both the amplitude and phase of the waveform.

The excitation waveform output from the waveform generator 34 is preferably a summation of two or more waveforms. Referring to FIG. 3, for each channel, the waveform generator 34 (FIG. 2) preferably comprises two waveform generators 50 and 52 and a summer 54. As discussed below, one of the waveform generators 50 or 52 generates a waveform associated with the desired fundamental spectral response and the other waveform generator 50 or 52 generates a waveform associated with the desired harmonic frequency spectral response (e.g. pre-distortion excitation waveform) to compensate for non-linearities. The waveforms are summed by the summer 54. Alternatively, outputs from multiple voltage sources are summed by applying the output to the electrostatic transducer 16.

In an alternative construction, the waveform generator 34 comprises one waveform generator capable of outputting a waveform corresponding to the desired pre-distorted excitation waveform (i.e., a single excitation waveform that includes both the fundamental spectral response and any harmonic spectral response to compensate for non-linear output of the electrostatic transducer array 16). For example, a single envelope is used to define a burst comprising both fundamental and harmonic frequency components. One possible embodiment for this alternative construction is described in U.S. Pat. No. 5,913,823, the a disclosure of which is herein incorporated by reference. Alternatively, real values for both fundamental and harmonic signals are summed off-line in a computer, and the resulting digital waveform is stored for use by the transmit beamformer.

In use, each channel responds to an ultrasound transmit line and/or portion of a ultrasound transmit line selection signal on line 44 by loading the delay word 38 for the selected ultrasound transmit line or portion of the ultrasound transmit line into the delay counter 36. The delay counter 36 responds to a start of line or a portion of line signal on line 42 by incrementing the stored value with each cycle of the 40 megahertz or other frequency clock on line 40. When the delay counter 36 increments to 0, it enables the waveform generator 34. Subsequently generated values of the delay counter 36 (incrementing now from zero words) became address values for the waveform generator 34. As each word in the waveform memory of the waveform generator 34 is addressed, the corresponding 8-bit word for each of the waveform generators 50 and 52 (see FIG. 3) is read and modulated with a carrier to create the waveforms. A different carrier frequency and phase may be used for each envelope.

The phase of the carrier signal is set relative to the envelope. For example, the modulation is based on the equation $$e(t-\Delta)t)\cos 2\pi f_c(t-\Delta)t)$$

where e(t) represents the envelope, )t represents the amount of delay (delay word 38), and $f_c$ represents the carrier frequency. Other modulating functions may be used. The phase of the carrier is preferably varied relative to the envelope to further focus the ultrasound transmit line, as known in the art. The phase is pre-calculated or is calculated in real time based on the delay word 38, the carrier frequency, and a desired delay value (less coarsely quantized than the delay word 38).

The two waveforms are summed together or both applied to the electrostatic transducer 16. Alternatively, the waveform generator 34 produces the waveform without summation. As another alternative, one waveform generator 34 is used for a plurality or all the channels. Summation is performed either in the analog or digital domains. The transmit beamformer 12 (FIG. 1) generates a copy of the waveform for each channel.

The output of the waveform generator 34 or each waveform generator 50 and 52 (see FIGS. 2 and 3) is scaled based on an apodization scheme and applied to a digital to analog converter 46. The analog output signal of the converter 46 is passed through a low pass filter 48, such as a Bessel filter, to reduce sampling effects and then to an amplifier 49. The output of the amplifier 49 is the excitation waveform that is applied to the respective transducer element of the electrostatic transducer array 16 via the multiplexer 14 (see FIG. 1).

Figure 8:
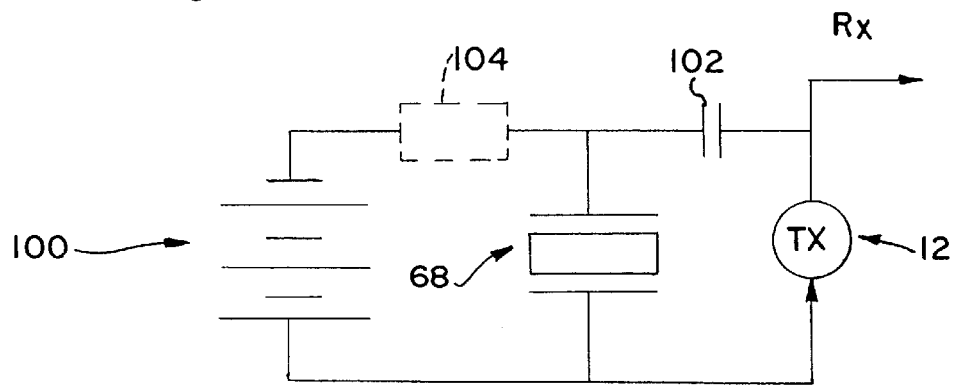
FIG. 8 is a block diagram representing one preferred embodiment for generating a DC bias.

Referring to FIG. 8, a DC bias voltage for the electrostatic transducer element 68 is generated by a DC power supply 100. Preferably, the DC supply 100 is programmable or at least provides selectable DC voltage levels. The DC bias voltage is connected directly to the element 68 while the AC ultrasonic signal is coupled via a blocking series capacitor 102 which blocks DC current flow between the transmitter 12 and the receiver.

Preferably, the DC power supply 100 does not short together the various elements 68 of the electrostatic transducer 16. For example, separate DC power supplies 100 are provided for each element 68. In another example, a high value series resistance 104 is provided. In yet another example, the DC bias is provided from charged capacitors connected to each element 68. Since the element capacitance is low, these charge holding capacitances, though large compared to the element capacitance, are still small. These capacitors are recharged sequentially between firings from the DC power supply 100 using an isolation switch.

The transmit beamformer 30 utilizes values for the waveform stored in the waveform generator 34 and the delays stored in the delay memory 32 that enhance insonification for harmonic imaging, such as contrast agent harmonic imaging. The excitation waveforms generated by the waveform generator 34 and the acoustic pressure waveforms transmitted from the transducer 16 (FIG. 1) are shaped to suppress ultrasonic energy in a wide passband centered at the harmonic center frequency.

The harmonics are suppressed by pre-distorting the excitation waveform applied to the electrostatic transducer array 16 (see FIG. 1). Pre-distortion accounts or compensates for harmonic information generated due to the non-linear response of the electrostatic transducer array 16. As used herein, "pre-distortion" of a waveform includes altering one or more characteristics of the waveform or generating a waveform to increase, decrease or account for distortions to the same or another waveform, such as non-linearity of the electrostatic transducer array and/or propagation non-linearity.

Various factors contribute to non-linear output. The force, F, of the acoustic waveform generated by the electrostatic transducer array 16 is proportional to the square of the applied voltage, V, of the excitation waveform. This relationship is represented as $F=kV^2$, where k is a constant. The excitation waveform is represented as $V=1+a \sin(\omega t)$, where a is the amplitude of the AC component. The DC bias voltage is assumed to be unity in this example. Therefore, $F=k(1+2a \sin(\omega t)+a^{2(\sin(\omega t))^2})$. The ratio of the non-linear generated response to the linear response of the electrostatic transducer 16 is 2/a. This ratio is greatest when "a" is small as a fraction of 1 (the DC bias level).

Other considerations are preferably accounted for to determine the appropriate DC bias voltage, AC component and associated compensation waveform to pre-distort the excitation waveform. The DC bias voltage is limited by the supply available, safety restrictions, and transmit beamformer 12 and electrostatic transducer 16 breakdown voltage levels. Other restrictions on the DC bias voltage may be considered. The applied AC component is preferably as large as possible to maximize the returned echo signal. Any of various voltage levels may be used, such as appropriate for a particular ultrasound system or application and/or as restricted by government or other safety guidelines. In one example, the DC bias voltage is about 30 volts and the AC voltage is about 16 volts peak-to-peak.

The DC and AC voltages are preferably as high as safely possible. For example, an AC signal peak voltage that is 50% of the DC voltage is used (i.e. the peak-to-peak voltage is 100% of the DC voltage). Other relationships may be used, including smaller or larger amplitude DC or AC components. For example, the AC component voltage is 25% of the DC voltage (i.e. the peak-to-peak voltage is 50% of the DC voltage).

The excitation waveform corresponding to the fundamental band has an amplitude or envelope, a center frequency, a bandwidth and a phase. The excitation waveform corresponding to the harmonic band also has an amplitude, a bandwidth, a center frequency and a phase. The bandwidth, amplitude and center frequency of the fundamental band excitation waveform are chosen as is well known in the art for harmonic imaging. The amplitude, phase, bandwidth, and center frequency of the harmonic band excitation waveform are chosen in order to provide maximum suppression of the harmonic output generated by the electrostatic transducer 16 due to application of the fundamental excitation waveform. The characteristics of the harmonic excitation waveform are determined through the use of modeling and/or experimentation.

Generally, for a Gaussian fundamental pulse of a given center frequency and bandwidth, the second harmonic center frequency is twice the fundamental center frequency, and the second harmonic relative bandwidth, measured at points −6.8 dB from the peak, is reduced from the fundamental bandwidth by a factor of $1/\sqrt{2}$. For example, a 3 MHz, 30% bandwidth fundamental waveform corresponds to a 6 MHz, 21% bandwidth second harmonic waveform. The phase of the second harmonic is determined by use of a model or empirically, but is typically aligned to maximize suppression of the undesired harmonic transmission. The second harmonic phase is such that the positive-going zero-crossings associated with the fundamental and second harmonic components of the waveform are aligned (for temporal waveforms). For unaligned waveforms, at least one negative slope zero-crossing associated with a second order harmonic component occurs within a quarter period of a negative slope zero-crossing associated with the fundamental component, where the period is the period of the fundamental component. The zero-crossing associated with the harmonic component is before or after the zero-crossing associated with the fundamental component. Other phase alignments are possible. The second harmonic amplitude is generally proportional to the square of the fundamental amplitude. If the amplitude of the fundamental component is increased by 3 dB, the second harmonic amplitude generally increases by 6dB. The absolute value of the second harmonic amplitude, given a fundamental amplitude, is determined by use of a model and/or empirically. The waveforms may be characterized in other ways. Furthermore, the discussion above is based on one particular harmonic and not the full spectrum for simplicity. The system 10 may generate waveforms including the full spectrum and taking into account the bandwidth of the system and the electrostatic transducer 16 (FIG. 1) or only selected portions of the spectrum. Other waveforms may also be used.

The discussion above is based on one transmit waveform applied with different delays and amplitude to each of the plurality of channels. The pre-distortion component preferably has an identical delay profile as the fundamental component. The delay profile determines the depth of focus and the amplitude profile determines the apodization. Identical apodization may also be applied to each of the two components. This approach is in general sufficient to reduce the harmonic level in a particular region of interest along the ultrasound beam. Either the transmit waveform is delayed and amplitude adjusted across an aperture width, or the harmonic waveform and fundamental waveform are amplitude adjusted or delayed separately prior to summation. Furthermore, one transmit waveform may be generated and copied for each channel as part of the design process or as part of the transmission process. In alternative embodiments, different delay profiles, apodization profiles, aperture widths or other characteristic of the fundamental beam or array aperture function relative to the harmonic beam or array aperture function are different.

To optimize the suppression of a harmonic band, such as the second order harmonic band, output from the electrostatic transducer 16, the characteristics of the harmonic excitation waveform are adjusted. While all four characteristics listed above and other characteristics may be varied, the center frequency and the bandwidth values are preferably developed by modeling. Preferably, the amplitude and phase are varied. Additionally, the characteristics could be varied for each transmit waveform or each channel separately. Through experimentation, the optimized characteristics of the harmonic band excitation waveform are determined, such as minimizing the harmonic component. By adjusting the phase of the harmonic band excitation waveform relative to the phase of the fundamental band excitation waveform, the phasing relationship discussed above regarding the zero-crossings changes. Generally, the positive peak is less and the negative peak is more than half the distance between the zero crossings corresponding to each peak in a spatial representation of the waveform.

In one embodiment, the excitation waveform used to compensate for non-linearities is determined iteratively in an adaptive scheme. The electrostatic transducer array 16 may generate non-linear output due to additional factors, such as membranes that operate different from a pure piston (e.g. operation when being driven near a limit of operation). Iterative adaptation may account for such additional sources of non-linear output.

By adaptation, the degree of non-linearity among various electrostatic transducers of interest is accounted for. For example, the system 10 (FIG. 1) is placed in a "learn mode". The controller 29 provides data controlling characteristics of the pre-distorted waveform. For example, the amplitude and phase of the harmonic band excitation waveform relative the fundamental band excitation waveform is controlled. A plurality of pre-distorted or non-distorted test waveforms are generated with different characteristics. Based on information from the signal processor 24, the controller 29 determines the pre-distorted waveforms corresponding to the least B-mode image brightness for the desired harmonic imaging band at the region of interest or as close to the electrostatic transducer 16 as possible. By using echoes from the first few mm, little or no second harmonic information is generated through non-linear propagation. In a variation of this approach, second harmonic levels are measured from the reflection off a dry, unloaded lens face of the transducer 16 relative to the fundamental component. Other measurements, including different ranges, may be used.

The system 10 is returned to a normal harmonic imaging mode for introduction of contrast agents or tissue harmonic imaging using the selected pre-distorted waveforms. Other characteristics may be used for adaptation. The characteristics of the waveforms may be controlled as a function of various system parameters, such as transmit voltage, transmit frequency, focus depth, transmit apodization, and transmit bandwidth. For example, the system controller 29 determines the characteristics based on the system parameters.

In another method for accounting for transmit channel non-linear characteristics, pre-distortion parameters associated with the transducer are stored. In one embodiment, the non-linear characteristics of each transducer 16 are measured at the factory and stored in non-volatile memory in the transducer 16. The system 10 reads the characteristics and applies the appropriate pre-distortion waveform. If variations from transducer to transducer are small, the non-linear characteristics of the electrostatic transducer type are measured at the factory and the parameters of the pre-distortion component waveform are stored in the operating software of the system 10.

Alternatively or in addition to the methods discussed above, some or all of the characteristics of the pre-distorted waveform are placed under user control. For example, an input, such as a knob, is provided for each of the amplitude of the harmonic band excitation waveform and phase of the harmonic excitation waveform relative to the fundamental band excitation waveform. Other characteristics and more or fewer characteristics may be placed under user control. The user adjusts the controls to achieve the darkest image or the least image brightness at the depth of interest, such as adjacent or close to the electrostatic transducer or at a region or regions of interest along each ultrasound transmit line. The selected pre-distorted waveform is then used for normal harmonic imaging.

Figure 4B:
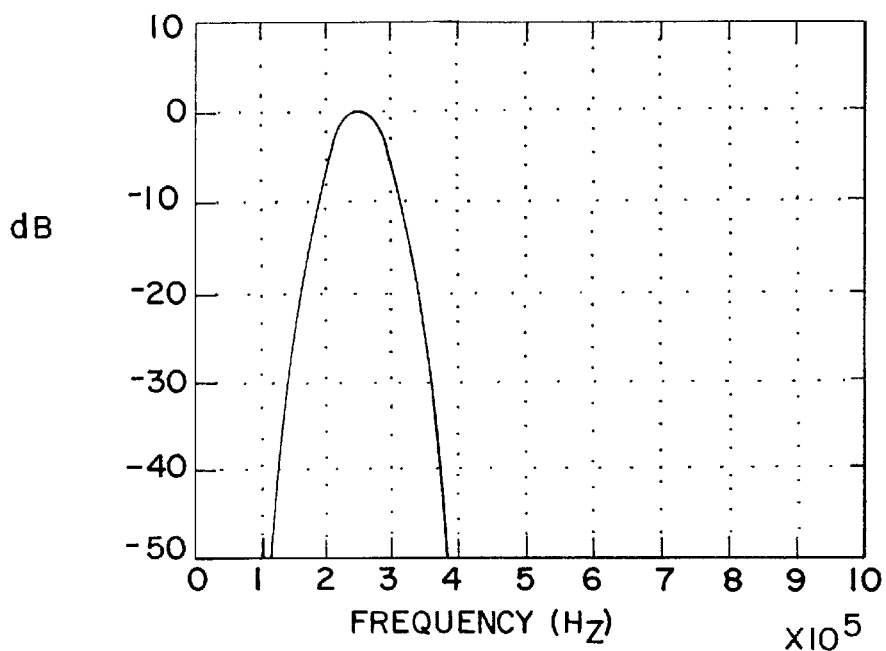
FIGS. 4B and 4D–F are graphical representations of one embodiment of spectral responses of the waveforms of FIGS. 4A, 4C, electrostatic transducer output responsive to the waveforms of FIGS. 4A and 4C, and the electrostatic transducer output responsive to the waveform of FIG. 4A.

FIGS. 4A–4F show excitation waveforms and the associated spectral response for one example of pre-distorting the excitation waveform to compensate for non-linear output of one element of the electrostatic transducer 16. FIG. 4A graphically represents a 2.5 MHz excitation waveform characterized by 40% fractional −6 dB bandwidth. This AC component is superimposed on a DC bias voltage such that the peak-to-peak amplitude is 100% of the DC level. FIG. 4B graphically represents the spectral response of the excitation waveform of FIG. 4A. The excitation waveform comprises the desired fundamental transmit waveform.

Figure 4C:
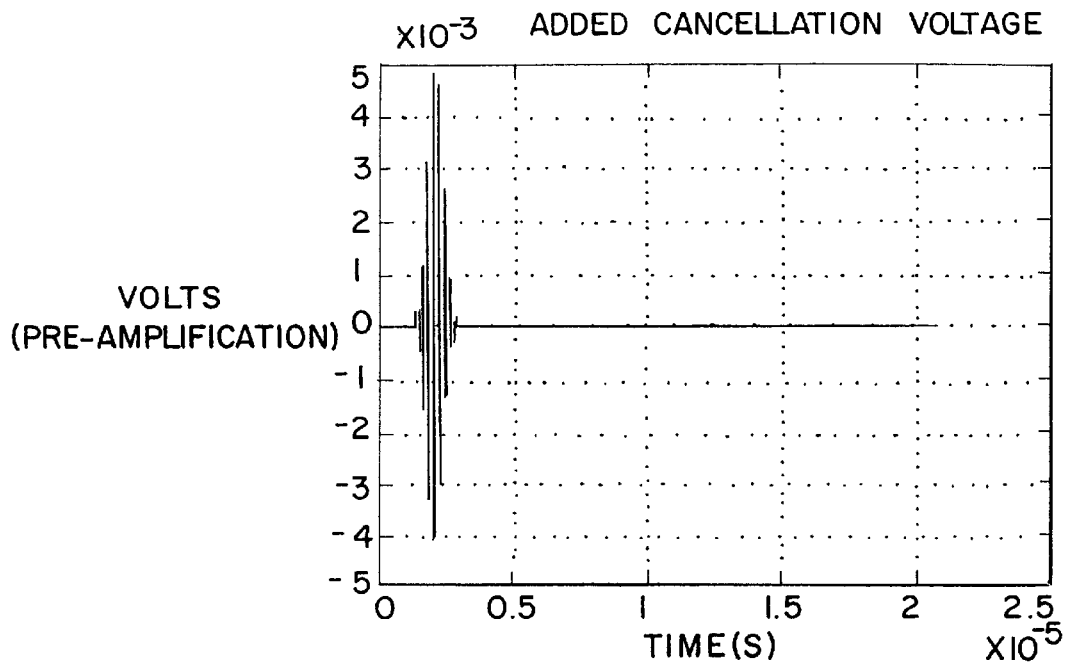
Figure 4D:
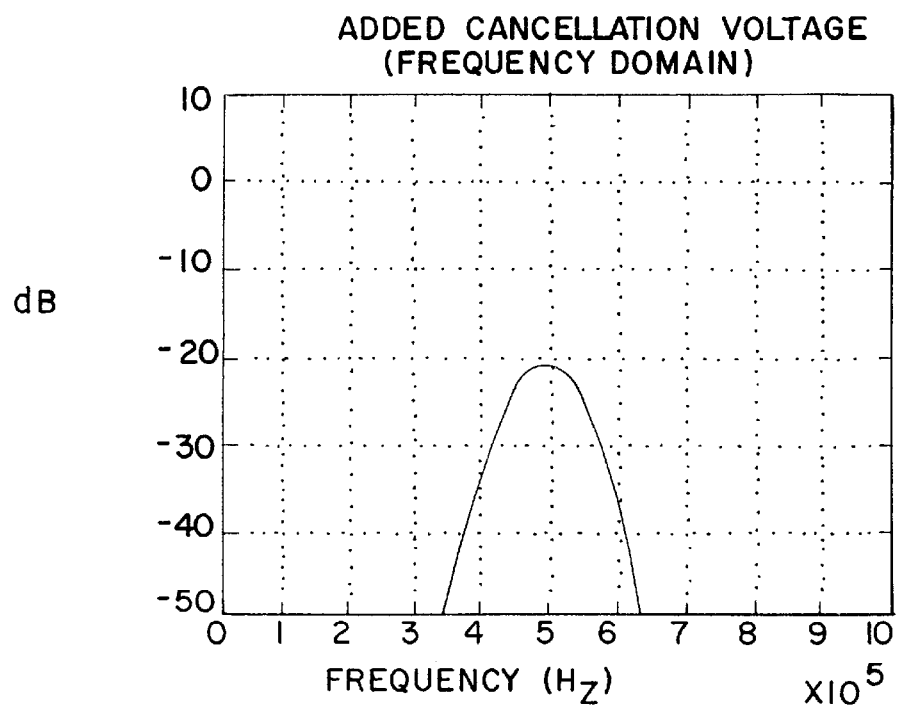
Figure 4E:
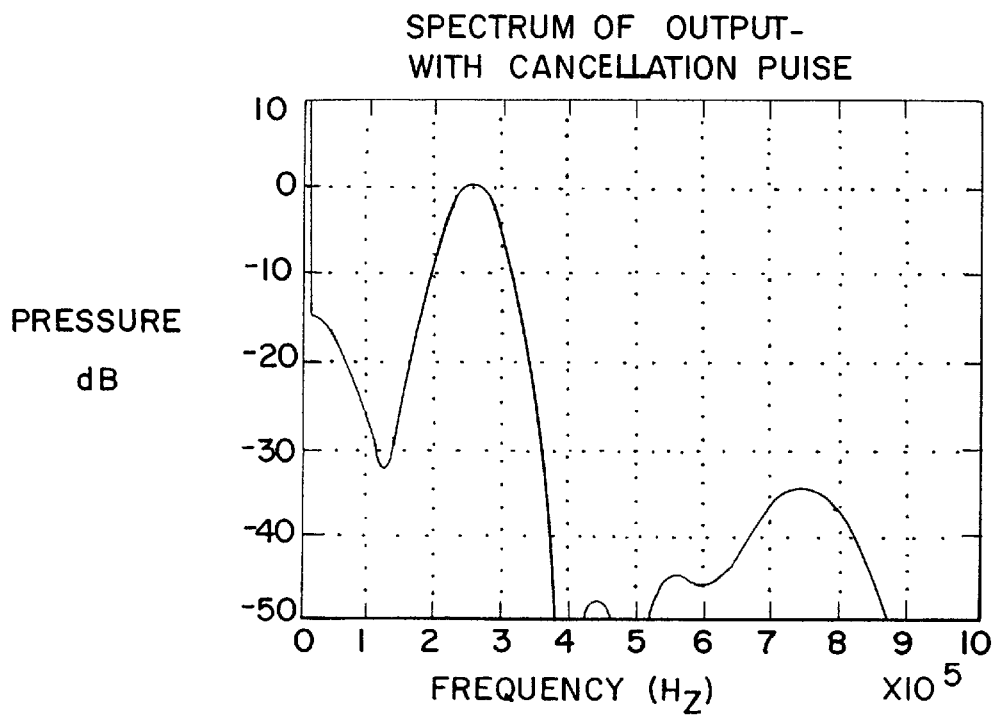
Figure 4F:
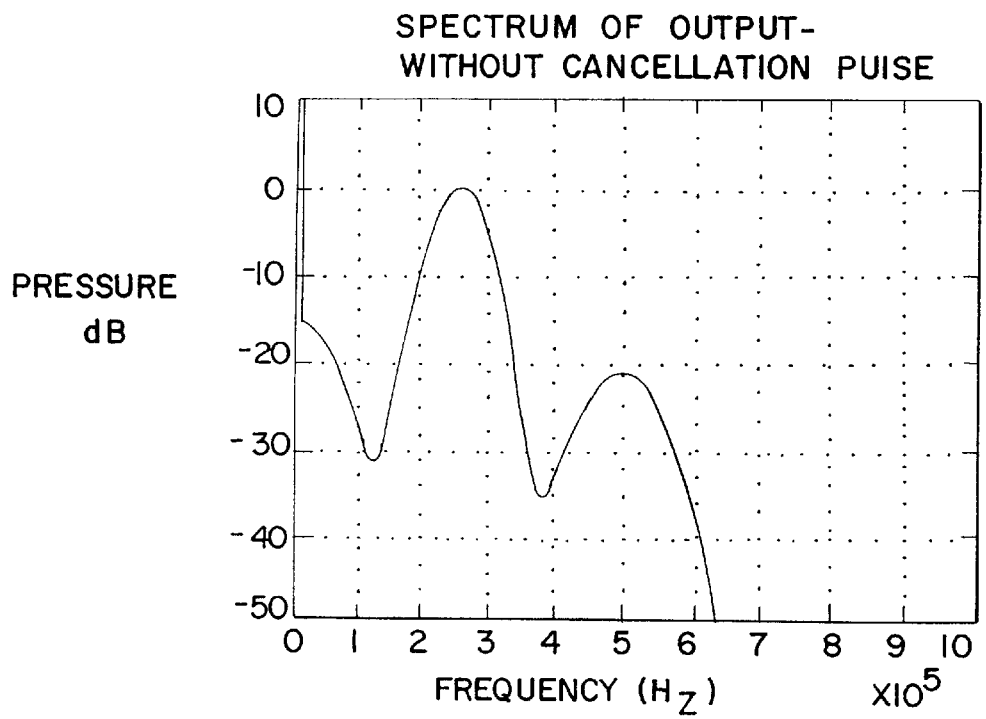

FIG. 4F graphically represents the output of the electrostatic transducer 16 in response to application of the excitation waveform of FIG. 4A. There is a −21 dB response at the second harmonic. Preferably, the response is −40 dB or greater at the harmonic of interest, such as the second harmonic.

A cancellation excitation waveform compensates for the harmonic response of the electrostatic transducer 16 to the application of the desired excitation waveform. The cancellation pulse preferably has the amplitude of the observed second harmonic generated by the electrostatic transducer, an appropriate fractional bandwidth (e.g. approximately the square root of one half times the original), and is inverted relative to the undesired harmonic. FIG. 4C graphically represents the cancellation excitation waveform for compensating the non-linear response due to the excitation waveform represented in FIG. 4A. FIG. 4D graphically represents the spectral response of the excitation waveform of FIG. 4C. This method extends to higher harmonics. For example, the pre-distortion signal applied may give rise to a response at the fourth harmonic. A pre-distorting signal designed to suppress the fourth harmonic may be applied.

Applying the two excitation waveforms (FIGS. 4A and 4C) to the electrostatic transducer 16 provides an acoustic output with reduced second harmonic output. FIG. 4E represents the spectral response of the output from the electrostatic transducer 16 in response to application of the waveforms of FIGS. 4A and 4C. The second harmonic response is reduced to approximately −48 dB.

Other excitation waveforms with the same or different envelope shape, number of cycles, bandwidth, or other characteristics may be used. Preferably, the harmonic of interest is reduced in the output waveform by −30 dB or −40 dB. Less or more reduction may be provided.

Once the pre-distorted waveform for each channel is determined, the waveform is separated into two components in the preferred embodiment. To apply the pre-distortion in the embodiment of FIG. 3, one beam is programmed with a desired apodization, delay and pulse-shaping profiles in the conventional manner, such as the waveforms generated by waveform generator 50. A second beam provides the pre-distortion component, such as the waveforms generated by the waveform generator 52. Alternatively, a single excitation waveform that includes the fundamental and harmonic components is generated.

In another embodiment, additional pre-distortion of the excitation waveform is provided to compensate for generation of harmonic information due to other transmit data path components, receive data path components and/or propagation of the acoustic waveform. The above described U.S. application Ser. No. 09/061,014 discloses such techniques.

In one embodiment, the DC bias voltage is adjusted to compensate for differences in transmit and receive mode operation of the system 10. This adjustment is used separately from or in addition to pre-distortion to compensate for non-linear output from the electrostatic transducer 16. The limitation on the DC bias voltage discussed above are especially relevant during the transmit mode. Returning echo signals are much smaller than the transmitted AC component, so a higher DC bias voltage may be used in the receive mode without voltage breakdown or bottoming out of the electrostatic transducer elements. Using the higher DC bias voltage allows for more efficient operation of the electrostatic transducer 16, results in a lower source impedance, and allows for a more linear response by the electrostatic transducer 16.

Figure 5A:
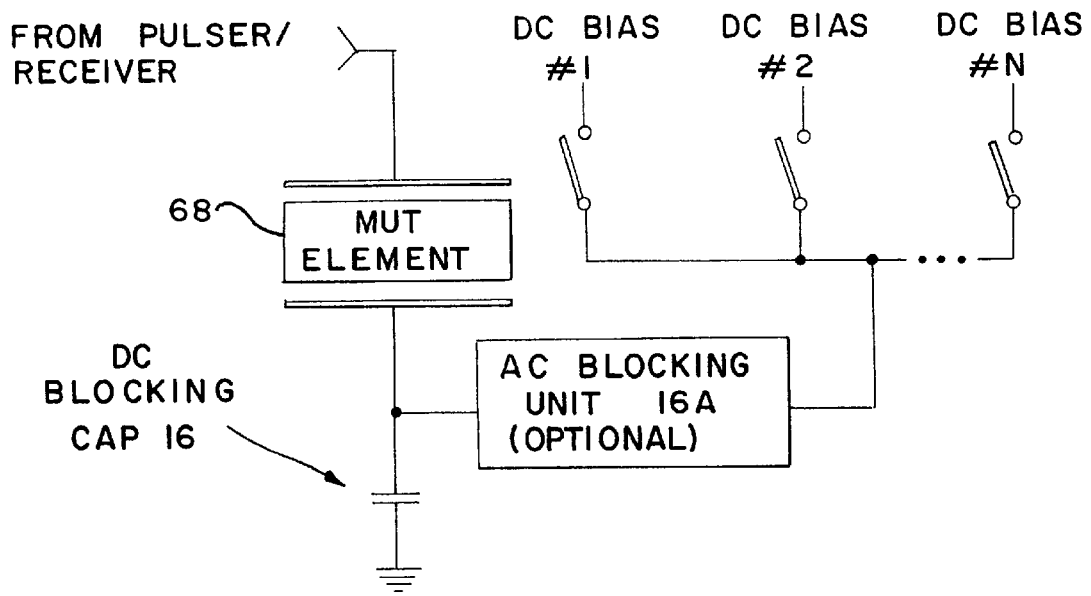
FIG. 5A schematically depicts one embodiment of a switchable voltage bias structure to adjust the center frequency of an electrostatic ultrasound transducer of a preferred embodiment.

FIG. 5A shows a capacitive micro-machined electrostatic transducer element at 68. Several voltage inputs 1, 2, . . . N provide a particular DC bias voltage to the element 68. A first bias voltage 1 (e.g. 30 volts) is applied to the element 68 in the transmit mode. A DC blocking capacitor 16 is also provided as is an optional AC blocking unit 16a. For reception, the second bias voltage 2 (e.g. 80 volts or an additional 50 volts where both voltages 1 and 2 added together) is applied to the element 68.

Figure 5B:
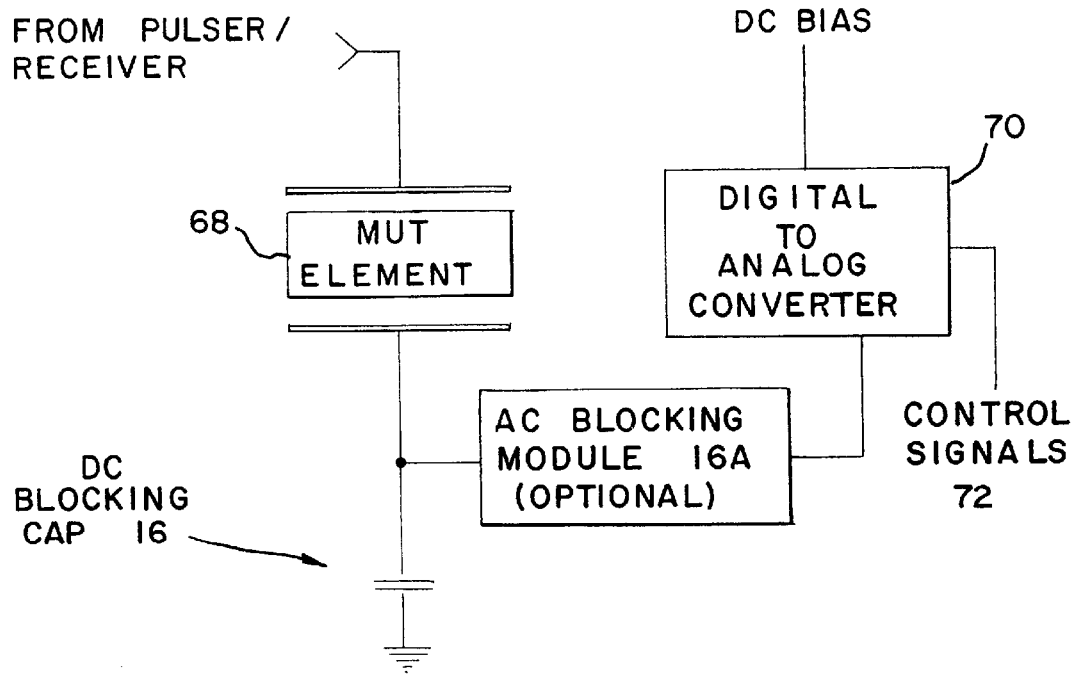
FIG. 5B schematically depicts a preferred embodiment of the biasing of FIG. 5A utilizing a digital/analog (DAC) converter comprising micro-machined switches and resistors to control voltage bias applied to the electrostatic transducer using a single source bias.

FIG. 5B depicts schematically one preferred embodiment of the biasing of FIG. 5A. A digital/analog (DAC) converter 70 comprising switches and resistors allows control of the bias voltage applied to the capacitive electrostatic transducer using a single source bias. By sending appropriate control signals 18 to the DAC 17, the bias voltage being applied to the micro-machined electrostatic transducer element 68 is varied. As an example, the single bias voltage source might be 200 volts and the DAC provides 16, 32 or another number of lesser reduced voltages. Furthermore, the DAC 17 may be constructed from micro-relays or micro-switches combined with resistors. The resistors may be laser-trimmed at manufacturing for extra precision during the setting of the values for each of the voltage choices.

Figure 6:
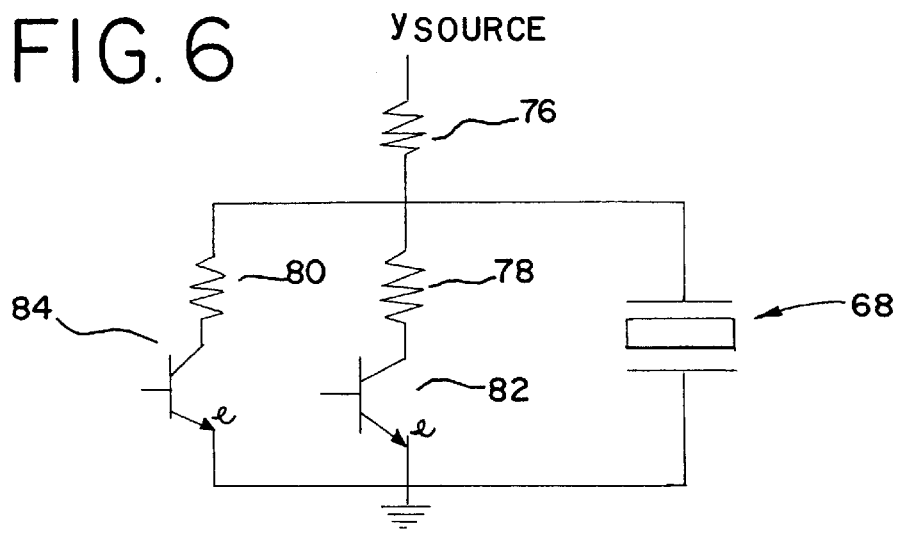
FIG. 6 is block diagram representing one preferred embodiments for applying different bias voltages to an electrostatic transducer array.

FIG. 6 show another preferred embodiment for switchably providing a different DC bias voltage for transmit and receive modes of operation. A voltage source is connected through a resistor 76 to two additional resistors 78 and 80 connected in parallel with the electrostatic transducer element 68. Two switches 82 and 84 connect in series with the additional resistors 78 and 80, respectively. The resistors 76, 78, and 80 are selected to provide voltage division of the source bias voltage. The switches 82 and 84 control whether and to what amount the resistors 78 and 80 contribute to the voltage division of the bias voltage. For example, the source resistor is 10 ohms and the additional resistors 78 and 80 are 10 and 100 ohms, respectively. One switch 82 associated with the 10 ohm additional resistor 78 is turned on during transmit and off during receive. The other switch operates inversely. Therefore, the bias voltage is half of the source bias voltage during transmit and 0.91 of the source bias voltage during receive. Other circuit networks and resistor values may be used. In one embodiment, the switches 82 and 84 comprises transistors that may be switched on gradually by increasing the base-emitter voltage. In yet another embodiment, the switches 82 and 84 are implemented using a micro-electrical mechanical system (MEMS).

In another embodiment, the DC bias voltage is adjusted to compensate for external forces applied to the electrostatic transducer array 16. External forces include pressure from contact with a patient, such as a force of a few pounds per square inch. Greater or lesser pressures may be applied. Compensation for external forces allows for better control of the output voltage for safety or for meeting government regulated output levels, provides more predictable and uniform penetration, and reduces the chances of the membrane bottoming-out.

External pressure causes the membrane or other mechanical structure of the electrostatic transducer 16 to deflect. Adjusting the DC bias voltage compensates for the deflection. In one example, the static pressure on the membrane is 2 atmospheres ($2\times10^5$ Pa), and the gap width with no applied field is 0.4 $\mu$m, ($d_o$). The gap width with an applied voltage is 0.2 $\mu$m. The applied voltage required to produce these conditions is 42.5 volts $$\left(P = \frac{\varepsilon V^2}{2(d_0 - x)^2} \Rightarrow V^2 = \frac{2P(d_0 - x)^2}{\varepsilon}\right).$$

If one atmosphere of additional pressure is applied directly to this membrane, the applied voltage for these conditions is 30.1

$$\left(V^2 = \frac{2P(d_{0-2c})^2}{\varepsilon}\right)(P = 1 \times 10^3 \text{ Pa}).$$

A reduced voltage is required due to the added external pressure.

The external force is measured as a function of the capacitance of the electrostatic transducer 16. Deflection of the membrane due to external forces changes the capacitance. Capacitance is related to the inter plate permittivity (about $8.854\times10^{-12}$ Farads/meter) multiplied by the area and divided by the inter plate distance. Since the area and permittivity are known, capacitance is inversely related to the inter plate separation distance.

Figure 7:
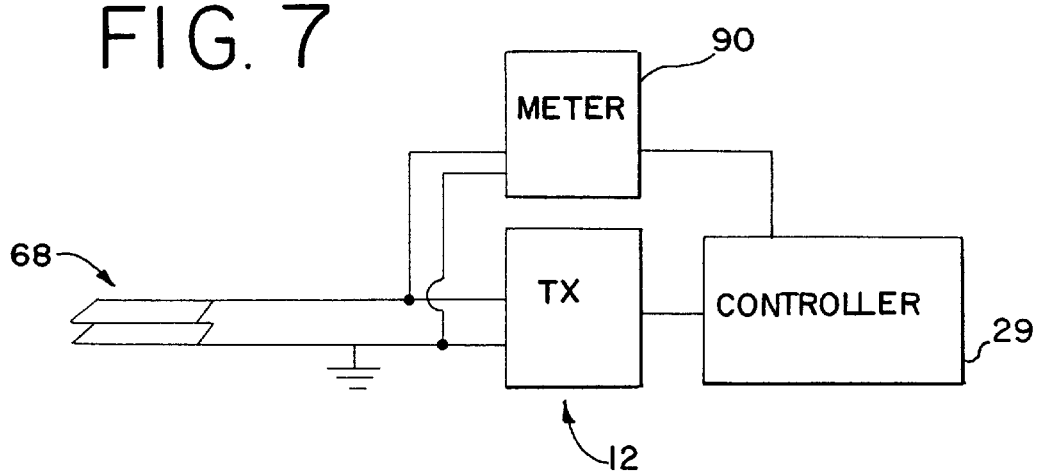
FIG. 7 is a block diagram representing one preferred embodiment for measuring the force applied to an electrostatic transducer array.

FIG. 7 shows one embodiment of a block diagram for measuring the capacitance and adjusting the DC bias voltage as a function of the measured force. The system includes at least one element 68 of the electrostatic transducer 16 (FIG. 1), the transmit beamformer 12, the controller 29 and a meter 90. The meter 90 comprises a capacitance meter. For example, an Andeen-Hagerling 2500 A with a digital interface is used. Other capacitance meters and/or methods may be used, such as suggested by B. McHaughy in "A Simple Method for On-Chip, sub femto Farad Interconnect Capacitance Measurement", IEEE Electron Device Letters, Vol. 18, No. 1, 1997.

The capacitance is measured on one, a plurality or all of the elements 68 of the electrostatic transducer array 16. Where a sampling of less than all of the elements 68 is used, the force, plate separation or capacitance at intermediate elements 68 is interpolated or extrapolated from measurements of other elements 68. Preferably, the element 68 is not operative during the measurement. The measured capacitance or capacitances are communicated from the meter 90 to the controller 29. Alternatively, the measurements are communicated to the transmit beamformer 12 or other source of the DC bias voltage.

The controller 29 determines the adjustment or absolute scaling factor for compensation. An increase in capacitance is compensated by a decrease in the applied DC bias voltage. The force varies with the square of the charge, Q. The charge is related to voltage in a capacitor by Q=CV. An increase by a fraction X of the capacitance is compensated by a scaling the applied DC bias voltage by 1/X. Further refinement may be used to account for any non-linearity where the changes are large. The scaling factor may be greater or lesser than the calculated factor. The compensation is preferably also applied to the AC component of the transmit excitation waveform. In alternative embodiments, one or the other of the DC and AC components are scaled. For receiving signals, the DC bias level is scaled. The compensation adjustments or absolute values are provided to the transmit beamformer 12 and/or the receive beamformer.

In one embodiment, the measurement of capacitance is used to estimate the actual applied external force. For example, the capacitance is cross referenced to a look-up-table relating known forces to measured capacitance. When the external force exceeds a threshold, a warning is provided to avoid damage to the electrostatic transducer 16.

In another embodiment, the measurement of capacitance is used to determine the condition of the electrostatic transducer 16. If the capacitance measured while the electrostatic transducer 16 is held in the air (i.e. no acoustic load) is significantly different from a nominal or design value, damage is indicated. Such damage results from broken electrodes, membranes or other damage. A capacitance that is high indicates that the membrane is pressed down undesirably.

The methods discussed above may be used with various other transmission schemes, including multiple pulse cancellation techniques. Multiple pulse cancellation techniques are discussed in U.S. Pat. No. 5,902,243 for an Ultrasonic Imaging Method With Multiple Pulse Cancellation, the disclosure of which is incorporated herein by reference. Examples of multiple pulse cancellation techniques are also disclosed in Hwang U.S. Pat. No. 5,706,819, Chapman U.S. Pat. No. 5,632,277 and by P. Jiang "A New Tissue Harmonic Imaging Scheme With Better Fundamental Frequency Cancellation And Higher SNR", 1998 Proc. IEEE Ultrasonics Symposium, pp 1589–1594.

These additive inverse techniques for selectively removing fundamental components of receive signals are further enhanced by pre-distortion of the corresponding excitation waveforms during transmit operation. Two or more pre-distorted ultrasonic pulses are transmitted into a subject along the same or adjacent beam direction, including first and second pulses of opposite polarity. The echo signals associated with the first and second pulses are summed, thereby causing linear components to cancel to a greater extent than non-linear components. For example, fundamental frequency components of the echo signal associated with linear propagation and scattering are selectively canceled, and second harmonic components of the echo signal due to non-linearities are enhanced. Excitation waveforms related with different phase relationships, such as 90 degrees, may be used. Subtraction or other functions may be used as an alternative to summation. More than two transmit beams and associated receive signals may be summed or subtracted. One, a plurality or all of the transmit excitation waveforms may be pre-distorted to compensate for non-linear output of the electrostatic transducer and/or other non-linear system or propagation response.

While the invention has been described above by reference to various embodiments, it will be understood that many changes and modifications can be made without departing from the scope of the invention. For example, pre-distortion is used for a sub-set or only one excitation waveform of all the waveforms applied to the electrostatic transducer. The compensations due to external force, non-linear output by the electrostatic transducer and different DC bias voltages for transmit and receive operations may be used separately or in combination.

It is therefore intended that the foregoing detailed description be understood as an illustration of the presently preferred embodiments of the invention, and not as a definition of the invention. It is only the following claims, including all equivalents, that are intended to define the scope of this invention.

What is claimed is:

1. A medical diagnostic ultrasound method for generating transmit pulses, the method comprising:
   a) applying a first excitation waveform component to a multiple element electrostatic transducer array;

b) applying a second excitation waveform component to the multiple element electrostatic transducer array;

c) compensating for non-linear output due to (a) with (b);

d) applying a DC bias voltage to the multiple element electrostatic transducer array; and e) varying the DC bias voltage as a function of transmit and receive modes.

2. A medical diagnostic ultrasound method for generating transmit pulses, the method comprising:

a) applying a first excitation waveform component to a multiple element electrostatic transducer array;

b) applying a second excitation waveform component to the multiple element electrostatic transducer array;

c) compensating for non-linear output due to (a) with (b); and d) performing (c) iteratively.

3. A medical diagnostic ultrasound method for generating transmit pulses, the method comprising:

a) applying a first excitation waveform component to a multiple element electrostatic transducer array;

b) applying a second excitation waveform component to the multiple element electrostatic transducer array;

c) compensating for non-linear output due to (a) with (b); and d) applying a DC bias voltage to the multiple element electrostatic transducer array;

wherein (a) comprises applying the first excitation waveform component with a peak-to-peak amplitude that is at least X% of the DC bias voltage, and a combined excitation waveform comprising the first and second excitation waveform components are less than Y% from the maximum at the second harmonic;

wherein X is 50% and Y is −30 dB.

4. The method of claim 3 wherein (c) comprises predistorting the first excitation waveform component with the second excitation waveform component.

5. The method of claim 3 wherein (a) and (b) comprise application to a micro-machined electrostatic transducer array.

6. The method of claim 3 further comprising:

e) measuring a displacement on the multiple element electrostatic transducer array; and f) applying a bias voltage responsive to the measurement of the displacement.

7. The method of claim 3 wherein (b) comprises applying the second excitation waveform component that is at a second harmonic of the first excitation waveform component.

8. The method of claim 3 wherein X is 100% and Y is −40 dB.

9. The method of claim 3 further comprising (e) generating the first and second excitation waveform components separately.

10. The method of claim 3 further comprising (e) generating the first and second excitation waveform components as a single waveform.

11. The method of claim 3 further comprising:

(e) generating the second excitation waveform component as a function of stored parameters.

12. The method of claim 3 wherein X is 100% and Y is −30 dB.

13. A medical diagnostic ultrasound method for generating transmit pulses, the method comprising:

a) applying a first excitation waveform component to a multiple element electrostatic transducer array;

b) applying a second excitation waveform component to the multiple element electrostatic transducer array;

c) compensating for non-linear output due to (a) with (b); and d) compensating for non-linear response due to non-linear propagation effects with (b).

14. A medical diagnostic ultrasound method for generating transmit pulses, the method comprising:

a) applying a first excitation waveform component to a multiple element electrostatic transducer array;

b) applying a second excitation waveform component to the multiple element electrostatic transducer array;

c) compensating for non-linear output due to (a) with (b); and d) transmitting at least one test waveform;

e) receiving echoes in response to (d); and f) determining at least one characteristic of the second excitation waveform component as a function of the received echoes.

15. A medical diagnostic ultrasound system for generating transmit pulses, the system comprising:

a multiple element electrostatic transducer array;

a transmit beamformer operable to apply a first excitation waveform component to the multiple element electrostatic transducer array and operable to apply a second excitation waveform component to the multiple element electrostatic transducer array;

wherein the second excitation waveform component is operable to compensate for non-linear output due to application of the first excitation waveform component; and a source of a DC bias voltage connected to the multiple element electrostatic transducer array, wherein the source is operable to vary the DC bias voltage as a function of transmit and receive modes.

16. A medical diagnostic ultrasound system for generating transmit pulses, the system comprising:

a multiple element electrostatic transducer array;

a transmit beamformer operable to apply a first excitation waveform component to the multiple element electrostatic transducer array and operable to apply a second excitation waveform component to the multiple element electrostatic transducer array;

wherein the second excitation waveform component is operable to compensate for non-linear output due to application of the first excitation waveform component; and a means for measuring a membrane displacement on the multiple element electrostatic transducer array; and a source of a bias voltage responsive to the measurement of the membrane displacement.

17. A medical diagnostic ultrasound system for generating transmit pulses, the system comprising:

a multiple element electrostatic transducer array;

a transmit beamformer operable to apply a first excitation waveform component to the multiple element electrostatic transducer array and operable to apply a second excitation waveform component to the multiple element electrostatic transducer array;

wherein the second excitation waveform component is operable to compensate for non-linear output due to application of the first excitation waveform component; and a source of a DC bias voltage connected to the multiple element electrostatic transducer array;

wherein the first excitation waveform component has a peak-to-peak amplitude that is at least X% of the DC bias voltage, and a combined excitation waveform comprising the first and second excitation waveform components are less than Y% from the maximum at the second harmonic;

wherein X is 50% and Y is −30 dB.

18. The system of claim 17 wherein the second excitation waveform component pre-distorts the first excitation waveform component.

19. The system of claim 17 wherein the multiple element electrostatic transducer array comprises a micro-machined electrostatic transducer array.

20. The system of claim 17 wherein the second excitation waveform component that is at a second harmonic of the first excitation waveform component.

21. The system of claim 17 wherein X is 100% and Y is −40 dB.

22. The system of claim 17 wherein the transmit beamformer is operable to generate the first and second excitation waveform components sepatately.

23. The system of claim 17 wherein the transmit beamformer is operable to generate the first and second excitation waveform components as a single waveform.

24. The method of claim 17 wherein X is 100% and Y is −30 dB.

25. A medical diagnostic ultrasound system for generating transmit pulses, the system comprising:

a multiple element electrostatic transducer array; and a transmit beamformer operable to apply a first excitation waveform component to the multiple element electrostatic transducer array and operable to apply a second excitation waveform component to the multiple element electrostatic transducer array;

wherein the second excitation waveform component is operable to compensate for non-linear output due to application of the first excitation waveform component; and wherein the beamformer is operative to iteratively compensate for the non-linear output.

26. A medical diagnostic ultrasound system for generating transmit pulses, the system comprising:

a multiple element electrostatic transducer array; and a transmit beamformer operable to apply a first excitation waveform component to the multiple element electrostatic transducer array and operable to apply a second excitation waveform component to the multiple element electrostatic transducer array;

wherein the second excitation waveform component is operable to compensate for non-linear output due to application of the first excitation waveform component; and wherein the second excitation waveform component is additionally operable to compensate for non-linear response due to propogation.

27. In a medical diagnostic ultrasound method comprising a) transmitting a plurality of waveforms from an electrostatic transducer array at a fundamental frequency, b) receiving reflected ultrasonic energy at a harmonic of the fundamental frequency and c) generating an image responsive to the reflected energy at the harmonic frequency in an ultrasound system, an improvement comprising:

a1) pre-distorting at least one of said plurality of waveforms as a function of a non-linear response of the electrostatic transducer array; and further comprising:

d) applying a DC bias voltage to the multiple element electrostatic transducer array; and e) varying the DC bias voltage as a function of transmit and receive modes.

28. The method of claim 27 wherein a1) comprises applying a second excitation waveform that is at a second harmonic of the at least one of said plurality of waveforms.

29. A medical diagnostic ultrasound method for generating transmit pulses, the method comprising:

a) measuring a displacement on a multiple element electrostatic transducer array;

b) applying a first excitation waveform to the multiple element electrostatic transducer array; and c) applying a bias voltage that is responsive to the measurement of the displacement to the multiple element electrostatic transducer array.

30. The method of claim 29 further comprising:

d) applying a second excitation waveform to the multiple element electrostatic transducer array; and e) compensating for non-linear output due to (b) with (d).

31. The method of claim 29 further comprising:

d) varying the DC bias voltage as a function of transmit and receive modes.

32. The method of claim 29 wherein a) comprises measuring the displacement on a membrane of an electrostatic transducer array.

33. The method of claim 29 wherein a) comprises measuring the displacement on a micro-machined electrostatic transducer array.

34. The method of claim 29 wherein a) comprises measuring a capacitance of the electrostatic transducer array.

35. The method of claim 29 further comprising:

d) applying the bias voltage during a transmit mode.

36. The method of claim 29 further comprising:

d) applying the bias voltage during a receive mode.

37. The method of claim 29 wherein a) comprises sampling a sub-set of elements of the electrostatic transducer array.

38. A medical diagnostic ultrasound system for generating transmit pulses, the method comprising:

a multiple element electrostatic transducer array;

a displacement measurement device operatively connected with the multiple element electrostatic transducer array;

a transmit beamformer operable to apply a first excitation waveform to the multiple element electrostatic transducer array; and a source of a bias voltage responsive to a measurement of the displacement of a membrane of the multiple element electrostatic transducer array.

39. The system of claim 38 wherein the transmit beamformer is operable to apply a second excitation waveform to the multiple element electrostatic transducer array, and wherein the second excitation waveform is operable to compensate for non-linear output due to the first excitation waveform interaction with the multiple element electrostatic transducer array.

40. The system of claim 38 wherein the source is operable to vary the bias voltage as a function of transmit and receive modes.

41. The system of claim 38 wherein the electrostatic transducer array comprises a micro-machined electrostatic transducer array.

42. The system of claim 38 wherein the force measuring device comprises a device operable to measure a capacitance of the electrostatic transducer array.

43. The system of claim 38 wherein the force measuring device is operable to measure the force of a sub-set of elements of the electrostatic transducer array.

44. A medical diagnostic ultrasound method for generating transmit pulses, the method comprising:
   a) applying a first excitation waveform component to a multiple element electrostatic transducer array;
   b) applying a second excitation waveform component to the multiple element electrostatic transducer array;
   c) compensating for non-linear output due to (a) with (b); and
   d) generating the first and second excitation waveform components separately as two different waveforms.

45. A medical diagnostic ultrasound method for generating transmit pulses, the method comprising:
   a) applying a first excitation waveform component to a multiple element electrostatic transducer array;
   b) applying a second excitation waveform component to the multiple element electrostatic transducer array; and
   c) compensating for sub-harmonic non-linear output due to (a) with (b).

46. A medical diagnostic ultrasound method for generating transmit pulses, the method comprising:
   a) applying a first excitation waveform component to a multiple element electrostatic transducer array;
   b) applying a second excitation waveform component to the multiple element electrostatic transducer array;
   c) compensating for sub-harmonic non-linear output due to (a) with (b); and
   d) separately apodizing or delayingthe first and second excitation wave form components.

47. The method of claim 46 wherein (d) components separately adjusting amplitudes of the first and second excitation waveform compirses.

48. The method of claim 46 wherein (d) comprises seperately focusing the first and second excitation waveform components.

49. A medical diagnostic ultrasound method for generating transmit pulses, the method comprising:
   a) applying a first excitation waveform component to a multiple element electrostatic transducer array.
   b) applying a second excitaton waveform component to the multiple element electrostatic transducer array;
   c) compensating for sub-harmonic non-linear output due to (a) with (b); and
   d) generating the second excitation waveform component as a function of parameters corresponding to a characteristic of the multiple element electrostatic transducer array.

50. The method of claim 49 wherein (d) comprises generating the second excitation waveform component as a function of a type of transducer array.

51. A medical diagnostic ultrasound method for generating transmit pulses, the method comprising:
   a) applying a first excitation waveform component to a multiple element electrostatic transducer array;
   b) applying a second excitation waveform component to the multiple element electrostatic transducer array;
   c) compensating for sub-harmonic non-linear output due to (a) with (b); and
   d) adjusting a characteristic of the second excitation waveform component in response to user input.

52. A medical diagnostic ultrasound method for generating transmit pulses, the method comprising:
   a) applying a first excitation waveform component to a multiple element electrostatic transducer array;
   b) applying a second excitation waveform component to the multiple element electrostatic transducer array;
   c) compensating for sub-harmonic non-linear output due to (a) with (b);
   d) repeating (a) and (b); and
   e) combining first echo signals responsive to (a) and (b) with second echo signals responsive to (d).

53. The method of claim 52 wherein (e) comprises summing the first and second echo signals.

54. The method of claim 52 wherein (e) comprises subtracting the first echo signals from the second echo signals.

55. The method of claim 52 wherein (d) comprises repeating (a) and (b) with an opposite polarity.

* * * * *